United States Patent

Kobayashi et al.

Patent Number: 5,957,591
Date of Patent: Sep. 28, 1999

[54] ANTI-FRICTION BEARING

[75] Inventors: Eiichi Kobayashi; Yutaka Daikuhara, both of Nagano-ken, Japan

[73] Assignee: Minebea Kabushiki -Kaisha, Nagano-ken, Japan

[21] Appl. No.: 08/752,412

[22] Filed: Nov. 19, 1996

[30] Foreign Application Priority Data

Nov. 20, 1995 [JP] Japan ................................ 7-325157

[51] Int. Cl.⁶ .............. F16C 33/76; F02F 5/00; F02F 11/00

[52] U.S. Cl. .............. 384/488; 384/477; 384/481; 277/152; 277/235 A

[58] Field of Search ................. 384/129, 477, 384/488, 130, 607, 480–1, 490; 277/235 A, 53, 152

[56] References Cited

U.S. PATENT DOCUMENTS

| | | | |
|---|---|---|---|
| 3,396,977 | 8/1968 | Iguchi | 384/477 |
| 4,443,348 | 4/1984 | Wright et al. | 252/37.2 |
| 4,557,612 | 12/1985 | Neal | 384/477 |
| 4,650,195 | 3/1987 | Dreschmann et al. | 277/50 |
| 4,655,617 | 4/1987 | Yasui et al. | 384/465 |
| 4,772,138 | 9/1988 | Dreschmann et al. | 384/488 |
| 4,846,592 | 7/1989 | Tsumori et al. | 384/477 |
| 4,854,749 | 8/1989 | Kohigashi et al. | 384/482 |
| 5,037,213 | 8/1991 | Uchida et al. | 384/482 |
| 5,133,609 | 7/1992 | Ishiguro | 384/486 |
| 5,426,988 | 6/1995 | Ohata et al. | 384/488 |
| 5,513,918 | 5/1996 | Wan | 384/477 |
| 5,605,741 | 2/1997 | Hite et al. | 277/235 A |
| 5,615,896 | 4/1997 | Morvant | 277/235 A |
| 5,615,897 | 4/1997 | Akita | 277/235 A |

FOREIGN PATENT DOCUMENTS 0037477  2/1991  Japan ................. 277/235 A

*Primary Examiner*—John A. Jeffery
*Assistant Examiner*—Matthew A. Kaness
*Attorney, Agent, or Firm*—Lowe Hauptman Gopstein Gilman & Berner

[57] ABSTRACT

To permit stacking of seals without possibility of the stacking of their synthetic rubber seal members to one another, permit, when assembling the seals to produce anti-friction bearings, storing the seals as a stack in a stocker of an automatic assembler and, unlike the case of using silicon or like prior art anti-sticking material, substantially eliminate generation of fine particles or the like adversely affecting precision apparatuses and deteriorating the reliability thereof. In an anti-friction bearing comprising an inner ring (1), an outer ring (2), and rolling elements (3) provided between the inner and outer rings, the side gap between the inner and outer rings is closed by seals (4), which each include a synthetic rubber seal member (6) and a surface active material (7) coated thereon.

7 Claims, 2 Drawing Sheets

ANTI-FRICTION BEARING

BACKGROUND OF THE INVENTION

1. Field of the Invention

This invention relates to an anti-friction bearing, in which seal members are provided between inner and outer rings.

2. Description of the Prior Art

In an anti-friction bearing which comprises an inner ring, an outer ring and balls or like rolling elements provided between the inner and outer rings, seal members are provided between the inner and outer rings.

The seal members each comprise a metal core and a synthetic rubber member molded as a seal member on the metal core surface. When assembling such seals to produce anti-frictional bearings, they are stocked in a stacked form in a stocker of an automatic assembler.

The seals have to be supplied smoothly from the stocker to the automatic assembler. To prevent mutual sticking of the seals, the surface of the seal member molding of synthetic rubber is coated with an anti-sticking agent, for instance an oil mainly composed of silicon.

When the prior art anti-friction bearing is used for journaling in a rotary part of a precision machine, fine particles of the anti-sticking material are scattered in a gaseous form from the seal member surface to adversely affect other mechanisms in the precision machine.

For example, where the bearing is used for a rotary part of a hard disc drive motor, fine anti-sticking agent particles (of 1 μm and above) may be attached to the surface of a magnetic disc, which is rotating at a high speed with slight intersices (of 1 μm and below) provided between it and a magnetic head. The attached particles may collide with and cause damage to the magnetic head.

SUMMARY OF THE INVENTION

An object of the invention is to provide an anti-friction bearing, which can eliminate damage to the magnetic head.

To attain this object, in an anti-friction bearing according to the invention which comprises an inner ring, an outer ring, and rolling elements provided between the inner and outer rings, the side gap between the inner and outer rings is closed by seals each including a synthetic rubber member and a surface active material coated thereon.

Suitably, the seals in the anti-friction bearing according to the invention, each include a synthetic rubber molding formed on a metal core.

BRIEF DESCRIPTION OF THE DRAWINGS

The above and other objects, features and advantages of the invention will become more apparent from the detailed description of the preferred embodiment when the same is read with reference to the accompanying drawings, in which.

DETAILED DESCRIPTION OF THE PREFERRED EMBODIMENT

An embodiment of the anti-friction bearing according to the invention will now be described in detail with reference to the drawings 1 to 3.

Figure 1:
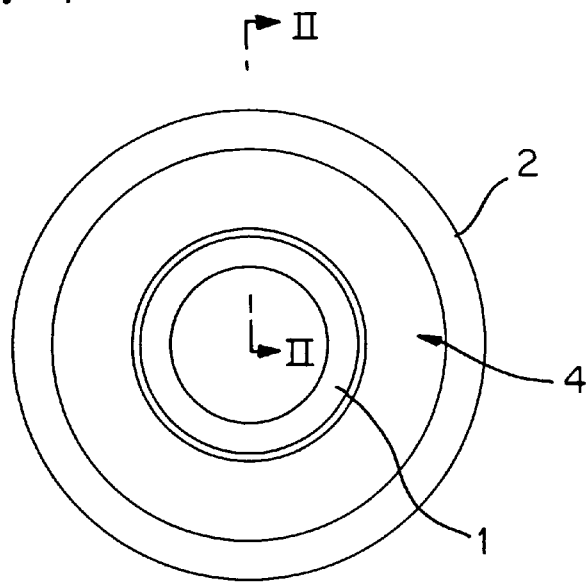
FIG. 1 is a front view showing an embodiment of the anti-friction bearing according to the invention.
Figure 2:
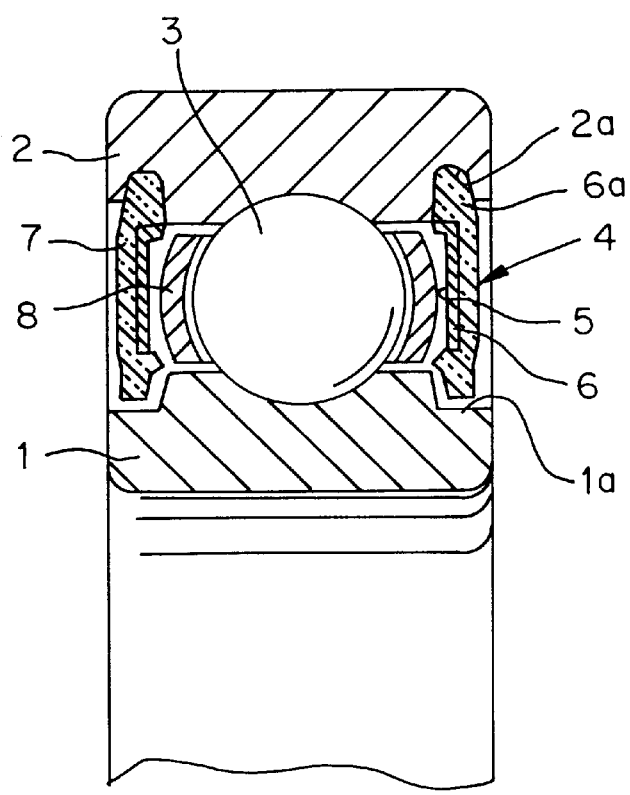
FIG. 2 is a sectional view taken along line II—II in FIG. 1.

FIGS. 1 and 2 show the anti-friction bearing according to the invention. In the figures, reference numeral 1 designates an inner ring, 2 an outer ring, and 3 balls provided as rolling elements between the inner and outer rings.

Figure 3:
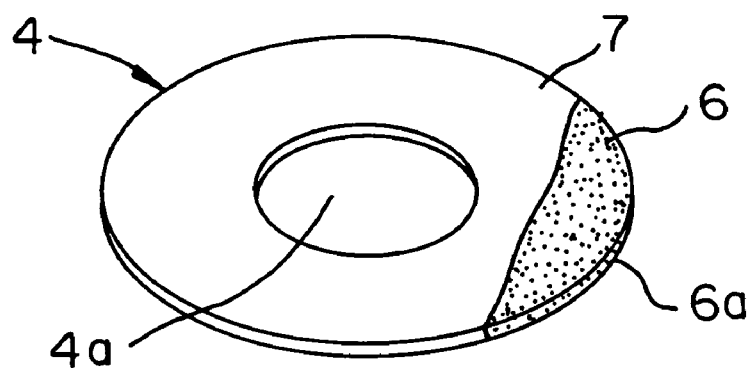
FIG. 3 is a perspective view showing a seal used for the anti-friction bearing according to the invention.

Reference numeral 4 designates seals which each essentially close the side gap between the inner and outer rings. Each seal 4 includes a ring-like metal core 5 and a synthetic rubber seal member 6 molded thereon. As shown in FIG. 3, a very thin surface active material layer 7 is formed as a surface active coating on substance of the seals 4.

Reference numeral 8 designates ball retainers.

By using as the surface active material a substance which is mainly composed of fatty acid soap, the seal member surface can be made slippery to provide a superior effect of preventing the sticking of the seals to one another and also facilitate the assembling of the seals to produce the bearing.

The surface active material layer 7 as the surface coating of the seal, may be formed agitating an aqueous solution of the surface active material with the non-coated seal dipped therein for a predetermined period of time. Alternatively, the aqueous solution of the surface active material is sprayed on the non-coated seal, followed by a drying treatment.

Each seal 4 is assembled by fitting the outer periphery 6a of the seal member 6 in a mounting groove 2a formed in the outer ring 2 by adequately deforming the outer periphery 6a against the elastic restoring force thereof.

By so doing, the edge of the central opening 4a of the seal is faced on the outer periphery of a reduced diameter edge portion 1a of the inner ring 1. In this way, the side gap between the inner and outer rings is closed by the seals 4.

Fine particles and gases, which are generated from the surface of the seals 4 in the anti-friction bearing having the above structure and undesired for precision apparatuses, were measured to confirm that their level is far below a prescribed level.

While in the above embodiment the surface active material was coated after the molding of the seal member, a surface active material which is mainly composed of fatty acid soap may also serve as a releasing agent when molding the seal member. In other words, this surface active material can facilitate the releasing in the molding process when it is coated beforehand.

The anti-friction bearing according to the invention having the above construction, provides the following functions and effects.

Since a surface active material which does not adversely affect precision apparatuses is coated, instead of the prior art anti-sticking material mainly composed of silicon, on the surface of the anti-friction bearing seal members, fine particles or the like adversely affecting precision apparatuses and deteriorating the reliability thereof are hardly generated from the seals in the anti-friction bearing according to the invention.

In addition, since the seals of the anti-friction bearing according to the invention have the surface active material layer as their surface coating, they can be stacked without possibility of the sticking of the synthetic rubber seal members to one another. Thus, when assembling them to produce anti-friction bearings, they can be stored as a stack in a stocker of an automatic assembler and automatically assembled smoothly between the inner and outer rings.

What is claimed is:

1. An anti-friction bearing comprising an inner ring (1), an outer ring (2), a plurality of rolling elements (3) provided between said inner and outer rings (1) (2), and seals (4)

essentially closing a side gap between said inner and outer rings (1) (2), wherein said seals (4) each include a seal member made of synthetic rubber (6) molded on an outboard side of a metal core (5) and all surfaces of said seals (4) are coated with a surface active material which is mainly composed of a fatty acid soap.

2. The anti-friction bearing according to claim 1, wherein said rolling elements are balls.

3. The anti-friction bearing according to claim 1, wherein said metal core faces said rolling elements.

4. The anti-friction bearing according to claim 3, wherein:
said outer ring includes an inner surface having a mounting groove therein and an outer peripheral portion of said synthetic rubber is mounted in said mounting groove, and
said inner ring includes an outer surface having a stepped portion thereon, said stepped portion including a first surface adjacent said rolling elements and a second surface stepped from said first surface, said second surface extending substantially to an annular surface of said inner ring,
an inner peripheral portion of said synthetic rubber positioned over said second surface.

5. The anti-friction bearing according to claim 1, wherein:
said outer ring includes an inner surface having a mounting groove therein and an outer peripheral portion of said synthetic rubber is mounted in said mounting groove, and
said inner ring includes an outer surface having a stepped portion thereon, said stepped portion including a first surface adjacent said rolling elements and a second surface stepped from said first surface, said second surface extending substantially to an annular surface of said inner ring,
an inner peripheral portion of said synthetic rubber positioned over said second surface.

6. The anti friction bearing according to claim 1, wherein said anti-friction bearing is configured for use in a rotary part of a hard disc drive motor.

7. The anti friction bearing according to claim 1, wherein all surfaces of said seal (4) are coated with a non-sticky surface active material selected for reducing adherance of stacked seals to each other.

* * * * *